(12) United States Patent
Ikada et al.

(10) Patent No.: US 12,059,722 B2
(45) Date of Patent: Aug. 13, 2024

(54) CLAMPING METHOD AND CLAMPING DEVICE

(71) Applicant: MITSUBISHI HEAVY INDUSTRIES, LTD., Tokyo (JP)

(72) Inventors: Akira Ikada, Tokyo (JP); Hideyuki Suzuki, Tokyo (JP); Yuichi Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 233 days.

(21) Appl. No.: 17/269,055

(22) PCT Filed: Nov. 15, 2019

(86) PCT No.: PCT/JP2019/044839
§ 371 (c)(1),
(2) Date: Feb. 17, 2021

(87) PCT Pub. No.: WO2020/105552
PCT Pub. Date: May 28, 2020

(65) Prior Publication Data
US 2021/0237144 A1     Aug. 5, 2021

(30) Foreign Application Priority Data
Nov. 22, 2018    (JP) .................................. 2018-219343

(51) Int. Cl.
*B21J 15/42*      (2006.01)
*B21J 15/02*      (2006.01)
(Continued)

(52) U.S. Cl.
CPC ............... *B21J 15/42* (2013.01); *B23B 35/00* (2013.01); *B23Q 3/06* (2013.01); *B21J 15/02* (2013.01); *B23Q 2703/02* (2013.01)

(58) Field of Classification Search
CPC .......... B21J 15/02; B21J 15/022; B21J 15/42; B23B 35/00
See application file for complete search history.

(56) References Cited

U.S. PATENT DOCUMENTS 3,729,801 A    5/1973   Gregory
4,858,289 A    8/1989   Speller, Sr.
(Continued)

FOREIGN PATENT DOCUMENTS

JP    2008-264832 A    11/2008
JP    2008-302399 A    12/2008
(Continued)

OTHER PUBLICATIONS

Japan Patent Office, "Office Action for Japanese Patent Application 2018-219343," Jan. 25, 2022.
(Continued)

*Primary Examiner* — Christopher J. Besler
(74) *Attorney, Agent, or Firm* — HAUPTMAN HAM, LLP (57) ABSTRACT

A clamping method includes a step (S3) for applying, by a first support portion disposed on one surface side of a plurality of superposed members and a second support portion disposed on the other surface side of the plurality of members, a predetermined first pressure to the plurality of members, and sandwiching the plurality of members; a step (S4) for forming a through hole with respect to the plurality of members by a cutting tool with the first pressure; a step (S5) for applying a predetermined second pressure to the plurality of members after the through hole is formed, and sandwiching the plurality of members by the first and second support portions, the second pressure being lower than the first pressure; and a step (S6) for fixing a fastening part
(Continued)

inserted into the through hole to the plurality of members by a riveting device with the second pressure applied.

2 Claims, 5 Drawing Sheets

(51) Int. Cl.
 *B23B 35/00* (2006.01)
 *B23Q 3/06* (2006.01)

(56) References Cited

U.S. PATENT DOCUMENTS

| | | |
|---|---|---|
| 2006/0117547 A1 | 6/2006 | Ffield et al. |
| 2019/0134699 A1 | 5/2019 | Inagaki et al. |
| 2022/0001460 A1* | 1/2022 | Ikada ................. B23B 35/00 |

FOREIGN PATENT DOCUMENTS

| | | |
|---|---|---|
| JP | 2016-016455 A | 2/2016 |
| JP | 2017-205802 A | 11/2017 |

OTHER PUBLICATIONS

PCT/ISA/210, "International Search Report for International Application No. PCT/JP2019/044839," Jan. 28, 2020.

* cited by examiner

CLAMPING METHOD AND CLAMPING DEVICE

RELATED APPLICATIONS

The present application is National Phase of International Application No. PCT/JP2019/044839 filed Nov. 15, 2019, and claims priority from Japanese Application No. 2018-219343, filed Nov. 22, 2018, the disclosure of which is hereby incorporated by reference herein in its entirety.

TECHNICAL FIELD

The present disclosure relates to a clamping method and a clamping device.

BACKGROUND ART

When a plurality of plate members (for example, skins) of aircraft parts are superposed or parts (for example, stringers) are attached to the plate members, the plurality of plate members or the plate members and the parts (hereinafter, "a plurality of members") are combined with each other by fastening parts such as rivets). A through hole for allowing a rivet to be inserted therethrough is formed by machining of a drill or the like after a clamping device sandwiches the plurality of members from both sides. After that, a rivet is inserted through the through hole, and the rivet is fixed to the through hole by a rivet fastening device. Accordingly, a plurality of parts are combined with each other.

The following PTL 1 describes that a plurality of parts are combined with each other by fastening in order to fix two parts integrally, and a robot device carries out initial tightening fitting and then carries out final tightening fitting with a force smaller than the initial tightening.

CITATION LIST

Patent Literature

[PTL 1] Japanese Unexamined Patent Application Publication No. 2016-16455

SUMMARY OF INVENTION

Technical Problem

While the through hole is formed in the plurality of parts and the rivet is fixed to the plurality of parts, in the related art, the clamping device does not change the clamping force and sandwiches the plurality of members with the same clamping force. However, depending on the thickness of the members and a position where the members are supported when the members are sandwiched, there is a case where the members bend in a convex or concave shape. In that state, when the rivet is fastened by the rivet fastening device and the rivet is fixed to the through hole, a gap is provided between the members and the rivet inside the through hole.

As a result, since a load is transmitted from the plate members to the rivet in portions other than the gap, the plurality of members combined with each other by the rivet cannot transmit the load using the entire surface of the rivet. As a result, the strength of the superposed plate members is lower than a predetermined value. For that reason, from the viewpoint of maintaining the fastening quality, it is required that the rivet is fixed such that a gap is not provided between the members and the rivet inside the through hole.

The present disclosure has been made in view of such circumstances, and an object thereof is to provide e a clamping method and a clamping device capable of making it difficult to form a gap between a fastening part and a plurality of members when the fastening part inserted through a through hole is fixed after the through hole is formed in the plurality of superposed members.

Solution to Problem

A clamping method according to the present disclosure includes a step of applying a predetermined first pressure to a plurality of members, which are superposed on each other, with a first support portion disposed on one surface side of the plurality of members and a second support portion disposed on the other surface side of the plurality of members to sandwich the plurality of members; a step of forming a through hole in the plurality of members with a cutting tool in a state where the first pressure is applied; a step of applying a predetermined second pressure lower than the first pressure to the plurality of members with the first support portion and the second support portion to sandwich the plurality of members after the through hole is formed; and a step of fixing a fastening part inserted through the through hole to the plurality of members with a fastening device in a state where the second pressure is applied.

According to this configuration, when the through hole is formed, the plurality of members are sandwiched by the predetermined first pressure, that is, a relatively high pressure. Therefore, the through hole can be formed through the plurality of members at once in a state where a gap is not formed between the plurality of members, and the through hole in which inner surfaces of the plurality of members are continuous are formed. Additionally, when the plurality of members are sandwiched by the predetermined second pressure, that is, a pressure lower than that when the through hole is formed, the fastening part is fixed to the plurality of members. In this case, by sandwiching the plurality of members between the first support portion and the second support portion so as not to bend, a gap is not easily formed between the fastening part and the plurality of members, and the fastening quality is improved.

In the clamping method according to the present disclosure, a support position of the plurality of members by the first support portion and a support position of the plurality of members by the second support portion may deviate from each other.

According to this configuration, when the first pressure is applied to the plurality of members, there is a case where the plurality of members bend in a convex or concave shape. Even in that case, when the fastening parts are fixed to the plurality of members, the plurality of members are sandwiched between the first support portion and the second support portion so as not to bend. Therefore, a gap is not easily formed between the fastening parts and the plurality of members, and the fastening quality is improved.

A clamping device according to the present disclosure includes a first support portion disposed on one surface side of a plurality of members, which are superposed on each other, and a second support portion disposed on the other surface side of the plurality of members; a drive unit that drives at least one of the first support portion and the second support portion; and a control unit that controls the drive unit. The control unit includes a first clamping force step that controls the drive unit such that the first support portion and the second support portion sandwich the plurality of members in a state in which a predetermined first pressure is applied to the plurality of members while a through hole is formed in the plurality of members by a cutting tool; and a second clamping force step that controls the drive unit such that the first support portion and the second support portion sandwich the plurality of members in a state in which a predetermined second pressure lower than the first pressure is applied to the plurality of members until a fastening part inserted through the through hole is fixed to the plurality of members by a fastening device after the through hole is formed.

Advantageous Effects of Invention

According to the present disclosure, when the fastening part inserted through the through hole is fixed after the through hole is formed in the plurality of superposed members, a gap cannot be easily formed between the fastening part and the plurality of members.

DESCRIPTION OF EMBODIMENTS

Figure 1:
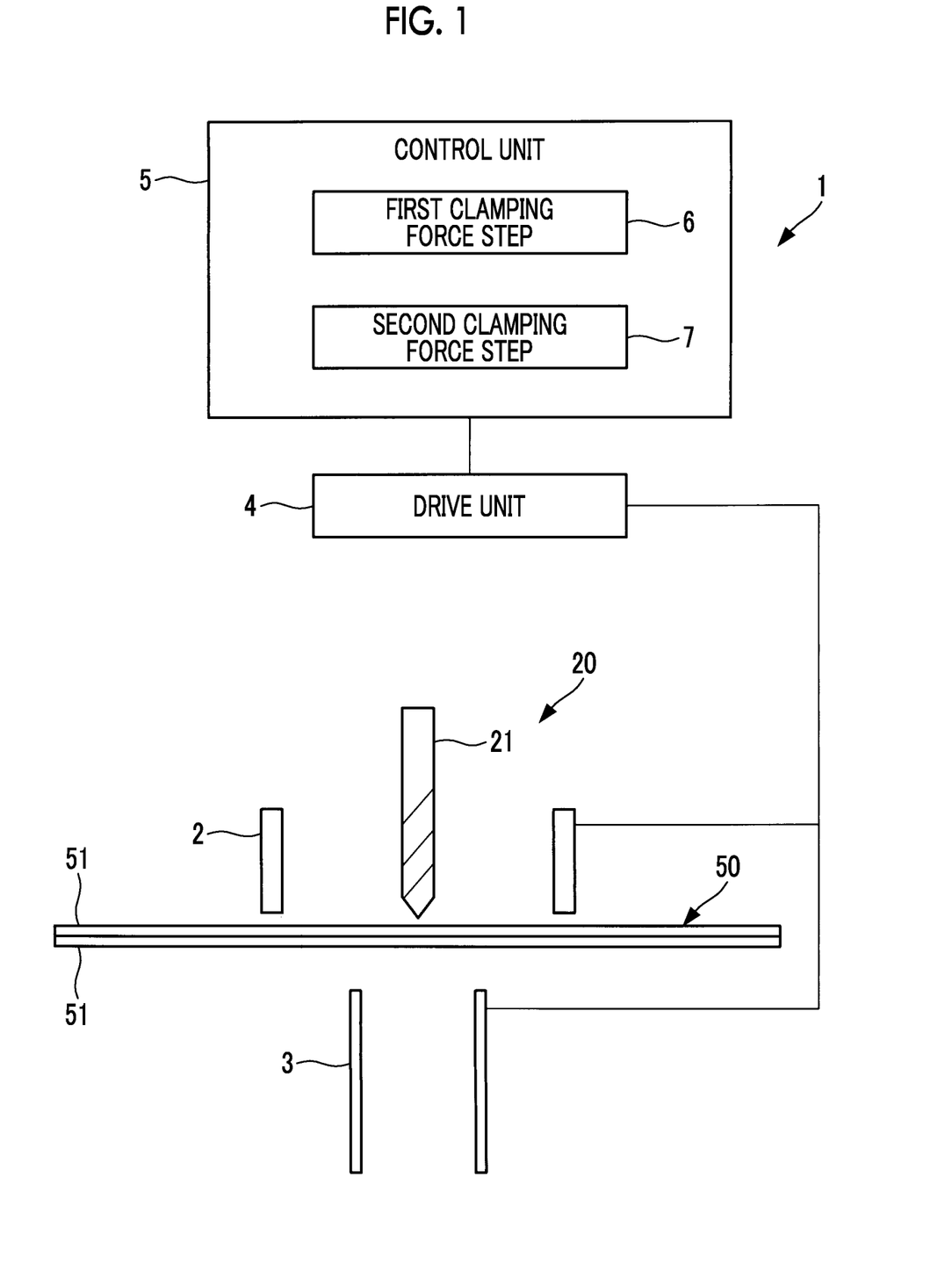
FIG. 1 is a schematic view illustrating a clamping device according to an embodiment of the present disclosure.

Hereinafter, an embodiment according to the present disclosure will be described with reference to the drawings. As illustrated in FIG. 1, the clamping device 1 includes an upper support portion (first support portion) 2, a lower support portion (second support portion) 3, a drive unit 4, a control unit 5, and the like. The clamping device 1 is capable of sandwiching a workpiece 50 disposed between the upper support portion 2 and the lower support portion 3. The workpiece 50 is, for example, a plurality of superposed plate members 51. Each plate member 51 is, for example, an aluminum alloy, a titanium alloy, composite material, or the like. A through hole 52 for fixing a rivet 53 is formed in the workpiece 50, and then the rivet (fastening part) 53 is inserted through the through hole 52 and fixed.

The upper support portion 2 includes, for example, a tubular member having a cylindrical shape and is disposed on an upper surface side of the workpiece 50. The upper support portion 2 supports the workpiece 50 at a lower end of the tubular member, centering on a position where the through hole 52 is formed.

The lower support portion 3 includes, for example, a tubular member having a cylindrical shape and is disposed on a lower surface side of the workpiece 50. The lower support portion 3 supports the workpiece 50 at an upper end of the tubular member, centering on the position where the through hole 52 is formed. The upper support portion 2 and the lower support portion 3 are configured to be movable in a direction in which the upper support portion 2 and the lower support portion 3 are separated from or brought closer to the workpiece 50 by the drive unit 4.

As illustrated in FIGS. 2A to 2F, a drill (cutting tool) 21 of the through-hole forming device 20 or an anvil (pressing portion) 31 of the fastening device 30 passes through the inside of the tubular member of the upper support portion 2. The diameter of the tubular member of the upper support portion 2 is larger than the diameter of the tubular member of the lower support portion 3. For that reason, a position where the upper support portion 2 supports the workpiece 50 and a position where the lower support portion 3 supports the workpiece 50 deviate from each other. For that reason, as will be described below, when a first pressure is applied to the workpiece 50, there is a case where the workpiece 50 bends upward in a convex shape.

Figure 2A:
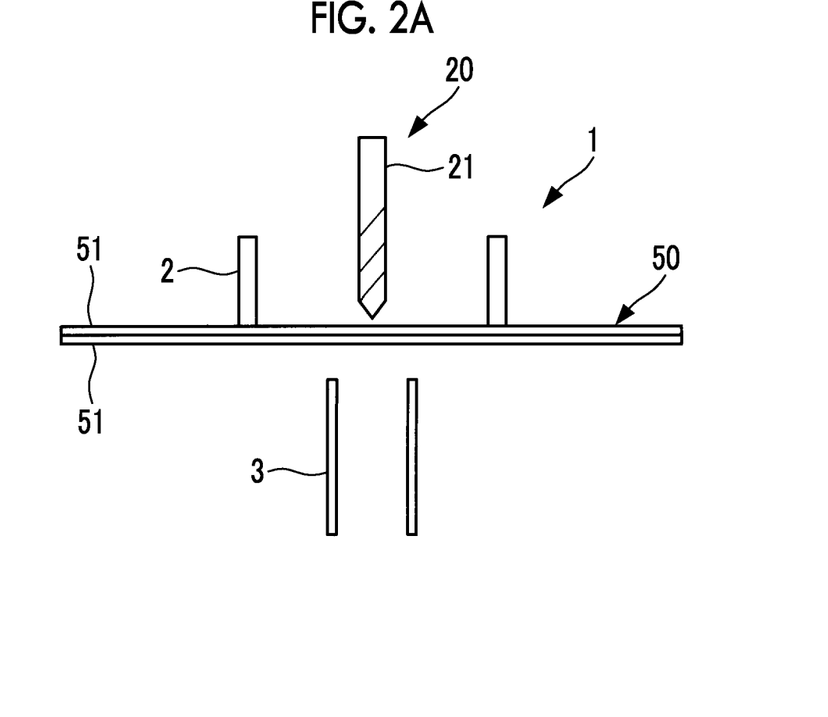
FIG. 2A is a schematic view illustrating the operation of the clamping device and a through-hole forming device according to the embodiment of the present disclosure.
Figure 2B:
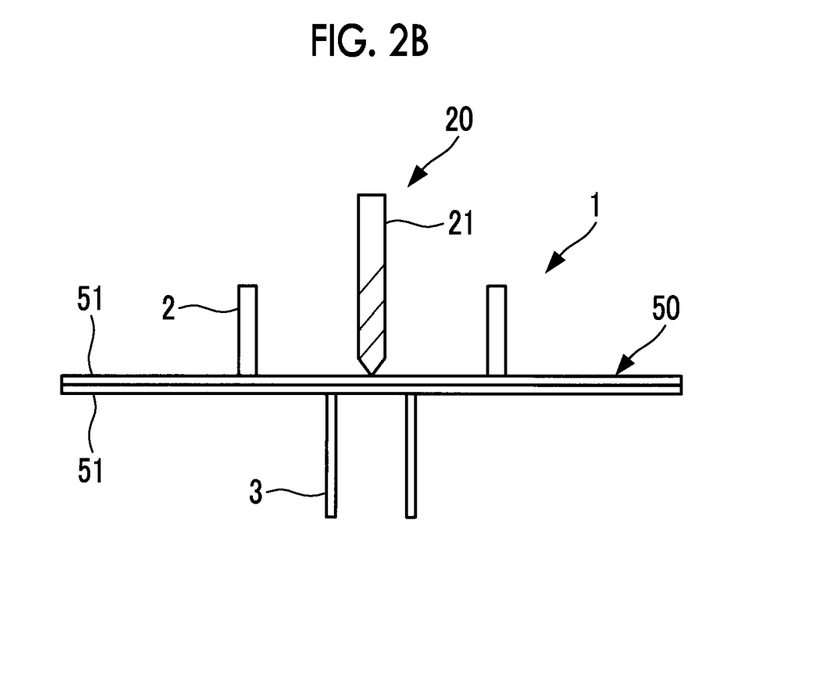
FIG. 2B is a schematic view illustrating the operation of the clamping device and the through-hole forming device according to the embodiment of the present disclosure.
Figure 2C:
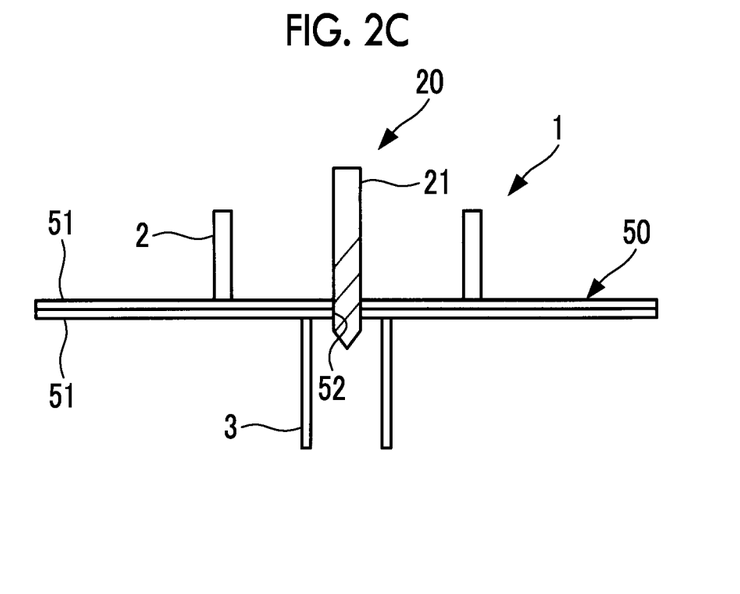
FIG. 2C is a schematic view illustrating the operation of the clamping device and the through-hole forming device according to the embodiment of the present disclosure.
Figure 2D:
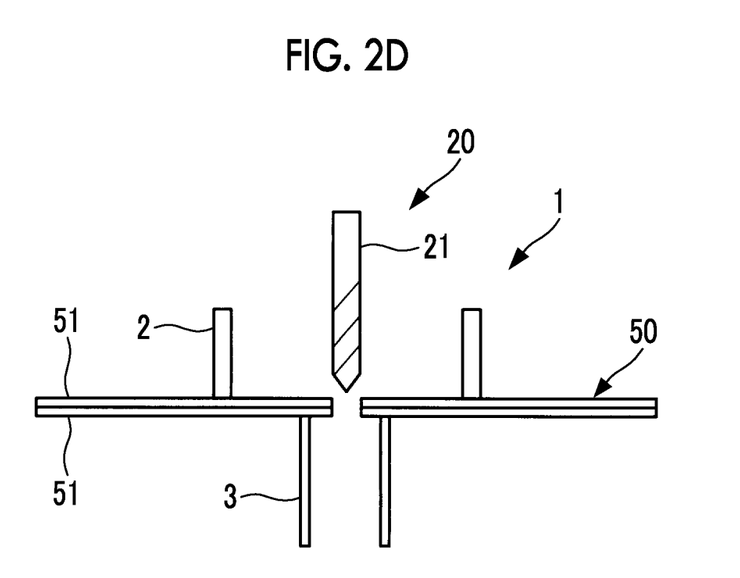
FIG. 2D is a schematic view illustrating the operation of the clamping device, the through-hole forming device, and a fastening device according to the embodiment of the present disclosure.
Figure 2E:
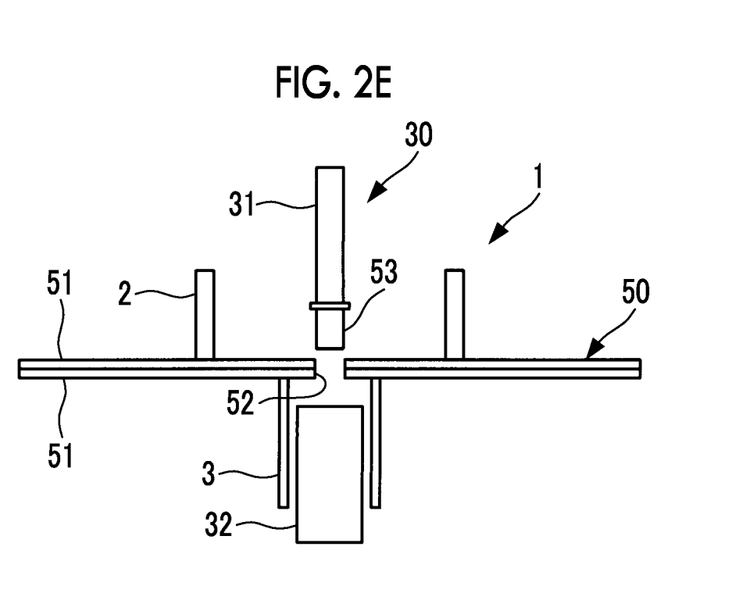
FIG. 2E is a schematic view illustrating the operation of the clamping device, the through-hole forming device, and the fastening device according to the embodiment of the present disclosure.
Figure 2F:
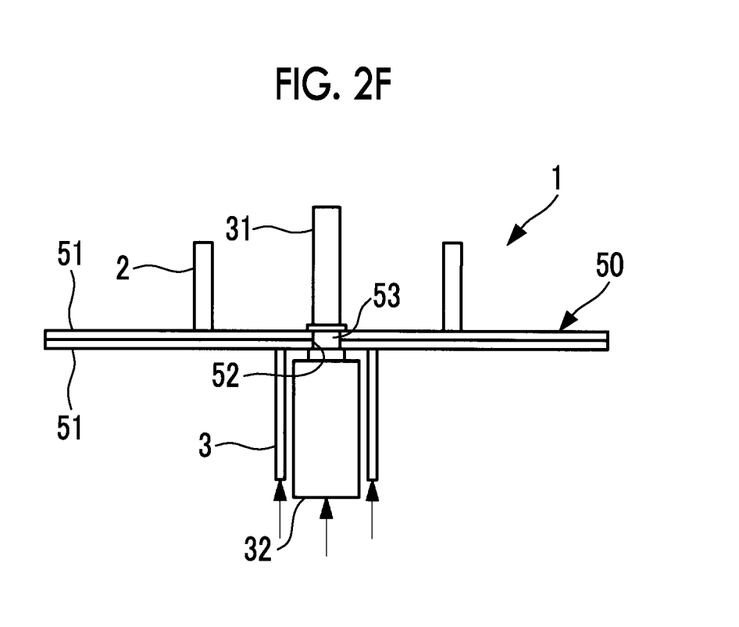
FIG. 2F is a schematic view illustrating the operation of the clamping device, the through-hole forming device, and the fastening device according to an embodiment of the present disclosure.
Figure 3:
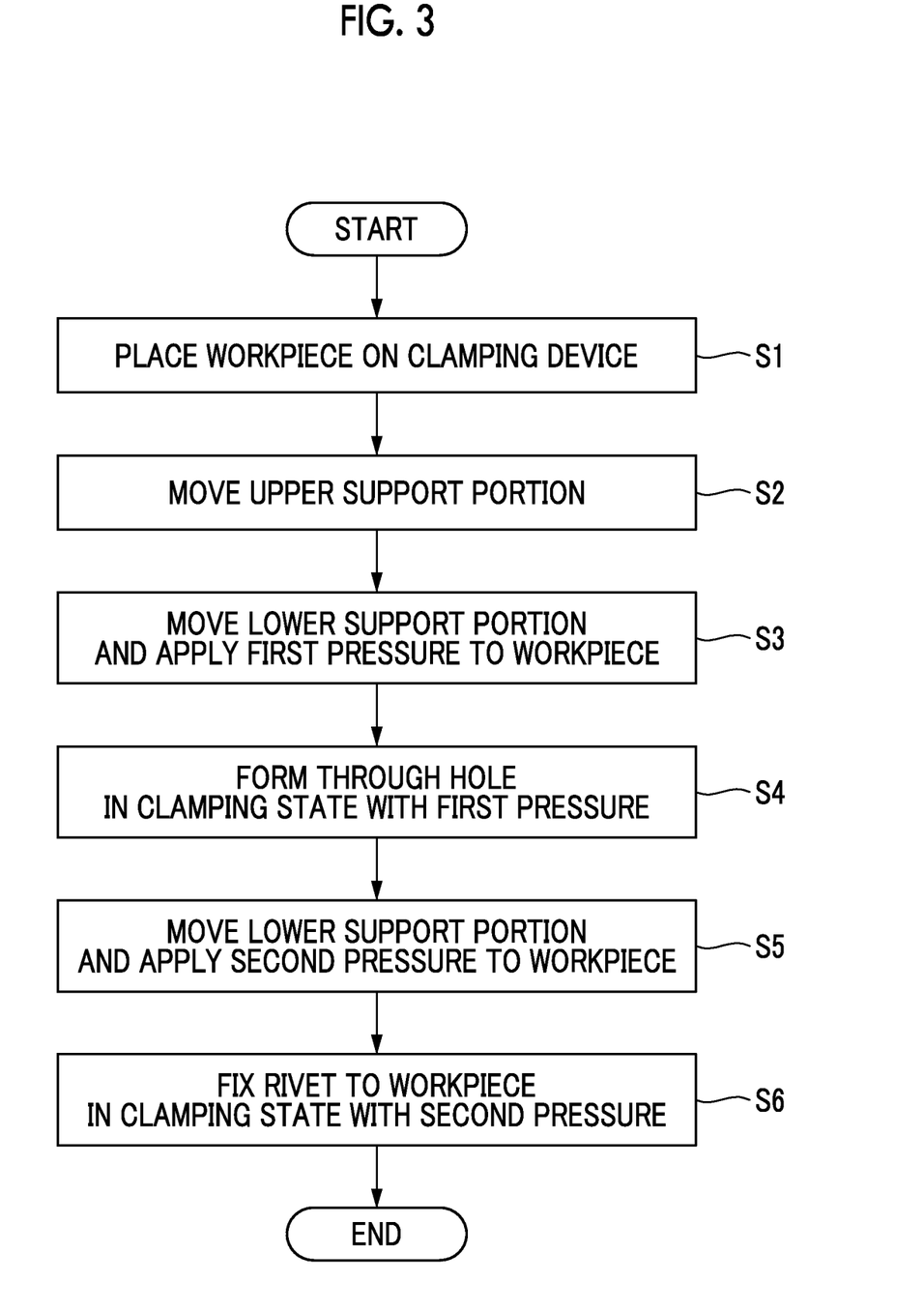
FIG. 3 is a flowchart illustrating the operation of the clamping device according to the embodiment of the present disclosure.

As illustrated in FIGS. 2E and 2F, the anvil (pressing portion) 32 of the fastening device 30 passes through the inside of the tubular member of the lower support portion 3. In the lower support portion 3 through which the drill 21 of the through-hole forming device 20 does not pass, the diameter of the tubular member is reduced, so that any interfere with other parts located around the lower support portion 3 does not occur easily during the work of forming the through hole 52 and the work of fastening the rivet 53.

In addition, the upper support portion 2 and the lower support portion 3 are not limited to, for example, the case where the tubular member having the cylindrical shape is provided, and the upper support portion 2 and the lower support portion 3 may be configured to support the workpiece 50 at a total of two points, one on each side of the position where the through hole 52 is formed, centering on the position where the through hole 52 is formed. In this case, a support point of the upper support portion 2 is located outside a support point of the lower support portion 3 with respect to the position where the through hole 52 is formed. For that reason, the position where the upper support portion 2 supports the workpiece 50 and the position where the lower support portion 3 supports the workpiece 50 deviate from each other.

The drive unit 4 is, for example, a motor, which is driven by receiving electric power to move the upper support portion 2 and the lower support portion 3 in an axial direction of the tubular members of the upper support portion 2 and the lower support portion 3, respectively.

The control unit 5 includes, for example, a first clamping force step 6 and a second clamping force step 7.

The first clamping force step 6 controls the drive unit 4 such that the upper support portion 2 and the lower support portion 3 sandwich the workpiece 50 in a state where a predetermined first pressure is applied to the workpiece 50 while the through hole 52 is formed in the workpiece 50 on which the plurality of plate members 51 are superposed by the drill 21. For example, the first clamping force step 6 moves the lower support portion 3 to a preset position. Alternatively, the lower support portion 3 is moved on the basis of a detection result of a detecting unit that detects a load acting on the workpiece 50 by the sandwiching of the upper support portion 2 and the lower support portion 3. As a result, the predetermined first pressure is applied to the workpiece 50.

In a case where the lower support portion 3 is moved to the preset position by the first clamping force step 6, the movement position thereof may be recorded in advance in a memory or the like and may be set for each workpiece 50 sandwiched by the clamping device 1. The movement position is acquired by confirming the position of the lower support portion 3 brought into a state in which the predetermined first pressure is applied to the workpiece 50 in a test or simulation performed before the actual manufacturing.

The predetermined first pressure is set to such a pressure such that the plurality of plate members 51 are not separated from each other when the spacing between the plurality of superposed plate members 51 is zero or a value close to zero and the through hole 52 is formed by the drill 21

The second clamping force step 7 controls the drive unit 4 such that the upper support portion 2 and the lower support portion 3 sandwich the workpiece 50 in a state where a predetermined second pressure lower than the first pressure is applied to the workpiece 50 until the fastening part inserted through the through hole 52 is fixed to the plurality of plate members 51 by the fastening device 30 after the through hole 52 is formed.

For example, the second clamping force step 7 moves the lower support portion 3 to a preset position. Alternatively, the lower support portion 3 is moved on the basis of the detection result of the detecting unit that detects the load acting on the workpiece 50 by the sandwiching of the upper support portion 2 and the lower support portion 3. As a result, the predetermined second pressure is applied to the workpiece 50.

In a case where the lower support portion 3 is moved to the preset position by the second clamping force step 7, the movement position thereof may be recorded in advance in a memory or the like and may be set for each workpiece 50 sandwiched by the clamping device 1. The movement position is acquired by confirming the position of the lower support portion 3 brought into a state in which the predetermined second pressure is applied to the workpiece 50 in a test or simulation performed before the actual manufacturing.

The predetermined second pressure is preferably set such that the plurality of superposed plate members 51 do not bend in a convex or concave shape.

The control unit 5 is constituted of, for example, a central processing unit (CPU), a random access memory (RAM), a read only memory (ROM), a computer-readable storage medium, and the like. Also, a series of processing for realizing various functions is stored in a storage medium or the like in the form of a program as an example, and the CPU reads this program into the RAM or the like to execute information processing and arithmetic processing, thereby realizing various functions. In addition, as the program, a form in which the program is installed in advance in the ROM or other storage medium, a form in which the program is provided in a state of being stored in a computer-readable storage medium, a form in which the program is distributed via wired or wireless communication means, or the like may be applied. Additionally, the computer-readable storage medium refers to a magnetic disk, a magneto-optical disk, a CD-ROM, a DVD-ROM, a semiconductor memory, or the like.

Next, the operation of the clamping device 1 according to the present embodiment will be described with reference to FIGS. 2A to 2F and FIG. 3.

In order to sandwich the workpiece 50 with the clamping devices 1, first, as illustrated in FIG. 2A, the workpiece 50 on which the plurality of plate members 51 are superposed is placed on the clamping device 1 (Step S1).

After the workpiece 50 is installed, the upper support portion 2 is brought closer to the workpiece 50 from above, and the lower end of the tubular member of the upper support portion 2 is brought into contact with the workpiece 50 (Step S2).

Next, as illustrated in FIG. 2B, the lower support portion 3 is brought closer to the workpiece 50 from below, and the upper end of the tubular member of the lower support portion 3 is brought into contact with the workpiece 50. The lower support portion 3 is moved, and the upper support portion 2 and the lower support portion 3 sandwich the workpiece 50 so as to be brought into a state in which a predetermined first pressure is applied to the workpiece 50 (Step S3).

When the predetermined first pressure is applied to the workpiece 50, the spacing between the plurality of superposed plate members 51 becomes zero or a value close to zero.

Then, as illustrated in FIG. 2C, the drill 21 forms the through hole 52 in the workpiece 50 in a state where the first pressure is applied to the workpiece 50 and the workpiece 50 is clamped (Step S4). The set value of the first pressure is a pressure at which the plurality of plate members 51 are not separated from each other when the through hole 52 is formed by the drill 21. Therefore, the through hole 52 can be formed through the plurality of plate members 51 at once in a state where a gap is not formed between the plurality of plate members 51, and the through hole 52 in which inner surfaces of the plurality of plate members 51 are continuous are formed.

As illustrated in FIG. 2D, the workpiece 50 is sandwiched such that, after the through hole 52 is formed, the lower support portion 3 is moved and the upper support portion 2 and the lower support portion 3 apply the predetermined second pressure lower than the first pressure to the workpiece 50 (Step S5).

As the predetermined second pressure is applied to the workpiece 50, the plurality of superposed plate members 51 are brought into a state of not bending in a convex or concave shape.

Next, as illustrated in FIGS. 2E and 2F, the rivet 53 is inserted through the through hole 52 in a state where the second pressure is applied to the workpiece 50, and the fastening device 30 fixes the rivet 53 inserted through the through hole 52 to the workpiece 50 (Step S6). The rivet 53 is fixed by the fastening device 30 in a state where the plurality of plate members 51 are sandwiched at a lower pressure than when the through hole 52 is formed and the plurality of the superposed plate members 51 do not bend in a convex or concave shape.

As a result, a gap is not easily formed between the rivet 53 and the plurality of plate members 51, and the fastening quality is improved. That is, the plurality of plate members 51 fixed by the rivet 53 do not partially transmit the load from the plate members 51 to the rivet 53 in portions other than the gap, but can transmit the load using the entire outer periphery of the rivet 53.

REFERENCE SIGNS LIST

1: clamping device
2: upper support portion (first support portion)
3: lower support portion (second support portion)
4: drive unit
5: control unit
6: first clamping force step
7: second clamping force step
20: through-hole forming device
21: drill (cutting tool)
30: fastening device
50: workpiece
51: plate member
52: through hole
53: rivet (fastening part)

The invention claimed is:

1. A clamping method comprising:
a step of applying a predetermined first pressure to a plurality of members, which are superposed on each other, with a first support portion disposed on one surface side of the plurality of members and a second support portion disposed on a second surface side of the plurality of members to sandwich the plurality of members;
a step of forming a through hole in the plurality of members with a cutting tool in a state where the predetermined first pressure is applied;
a step of applying a predetermined second pressure lower than the predetermined first pressure to the plurality of members with the first support portion and the second support portion to sandwich the plurality of members after the through hole is formed; and
a step of fixing a fastening part inserted through the through hole to the plurality of members with a fastening device in a state where the predetermined second pressure is applied to the plurality of members,
wherein an amount of the predetermined second pressure is maintained to be uniform.

2. The clamping method according to claim 1,
wherein a support position of the plurality of members by the first support portion and a support position of the plurality of members by the second support portion deviate from each other.

* * * * *